Oct. 6, 1931.  A. IMHOF  1,825,905

LEADING-IN INSULATOR

Filed Nov. 9, 1929  2 Sheets-Sheet 1

Oct. 6, 1931.  A. IMHOF  1,825,905
LEADING-IN INSULATOR
Filed Nov. 9, 1929  2 Sheets-Sheet 2
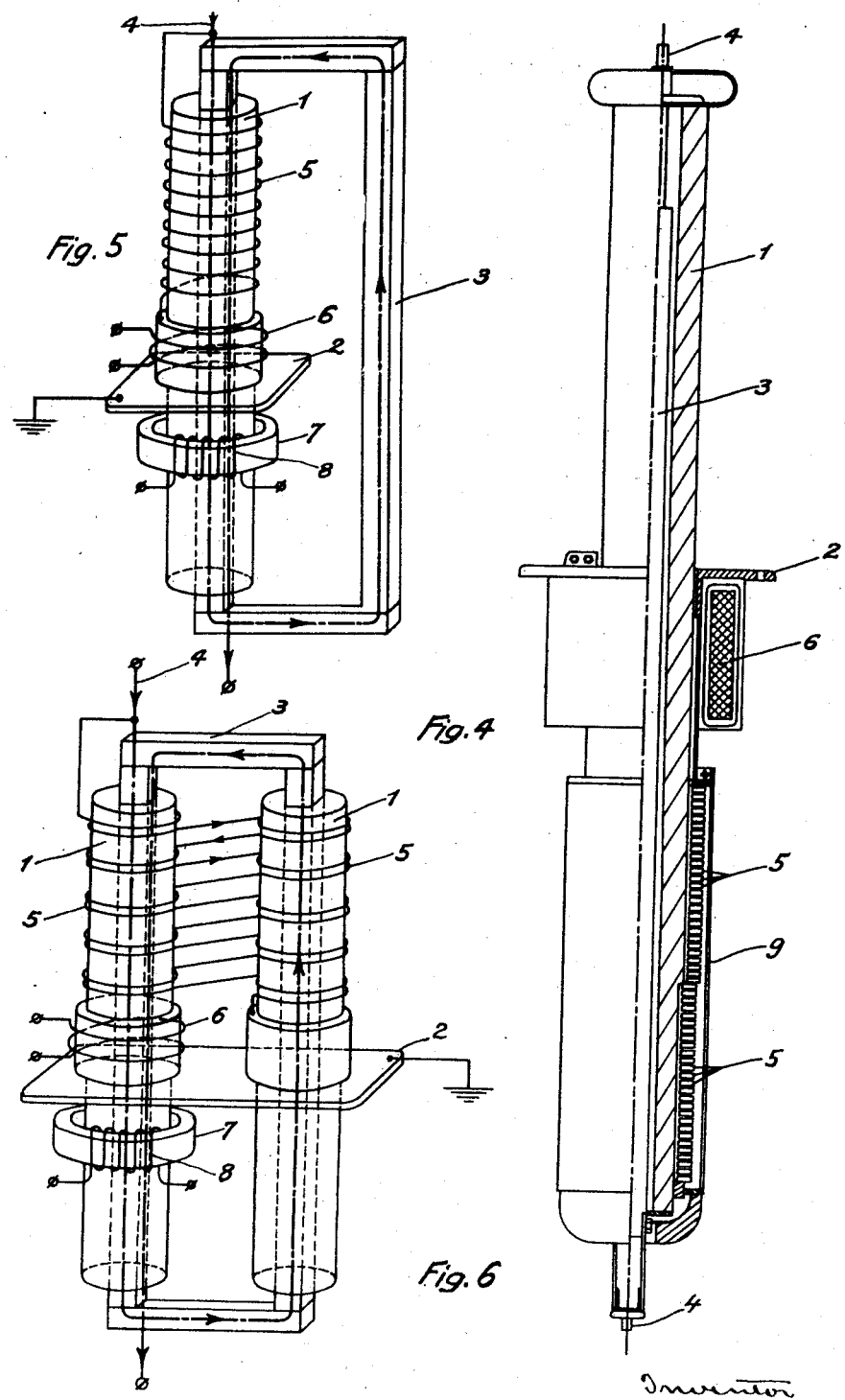

Patented Oct. 6, 1931

1,825,905

UNITED STATES PATENT OFFICE

ALFRED IMHOF, OF HONGG, NEAR ZURICH, SWITZERLAND

LEADING-IN INSULATOR

Application filed November 9, 1929, Serial No. 406,072, and in Germany November 15, 1928.

This invention relates to means for diverting relatively small amounts of energy from high potential transmission lines for synchronizing, relay operation, voltage indication and other measuring instruments, and has for one of its objects the provision of means of this character which shall be convenient and economical to install and operate and which will not require the use of expensive transformers.

Other objects and advantages will appear from the following description.

The invention is exemplified in the combination and arrangement of parts shown in the accompanying drawing and described in the following specification, and as more particularly pointed out in the appended claims.

In the drawing:

Fig. 4 is a longitudinal section of the invention with amplified details.

Figs. 5 and 6 are diagrams of further variations of the invention.

In high voltage circuits of transmission lines it is frequently necessary or advisable to have an indication of the current flowing in the line and also some indication of the voltage on the line. This can be obtained by the use of normal current transformers and potential transformers. Where the voltage is high, however, the insulation requirements of this class of apparatus make it necessary to build apparatus having considerable cost and size. Apparatus of this kind frequently causes an increased hazard owing to the fact that it is made as small as possible.

A substantial cheapening has been obtained with devices which do not permit of the direct measurement of the voltage between two conductors neither of which is grounded, but permit of the measurement of the voltage between a conductor and the earth. By suitably connecting together two such devices the voltage between uninsulated conductors can then be measured. To this group of devices also belongs that of the present invention, but it has, as compared with some of the known devices, the special advantage of greater deliverable output, and as compared with others the advantage of even lower cost and of occupying less space.

Figure 1:
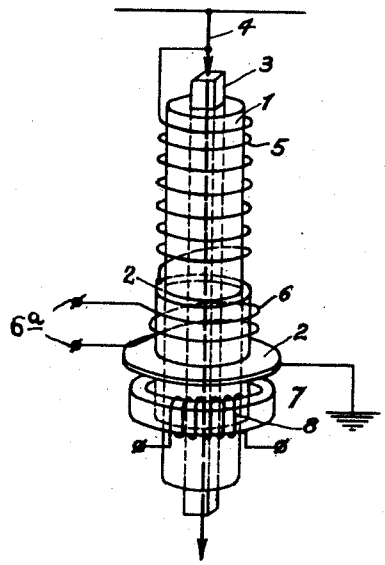
Fig. 1 is a diagram ilustrating the invention.
Figure 2:
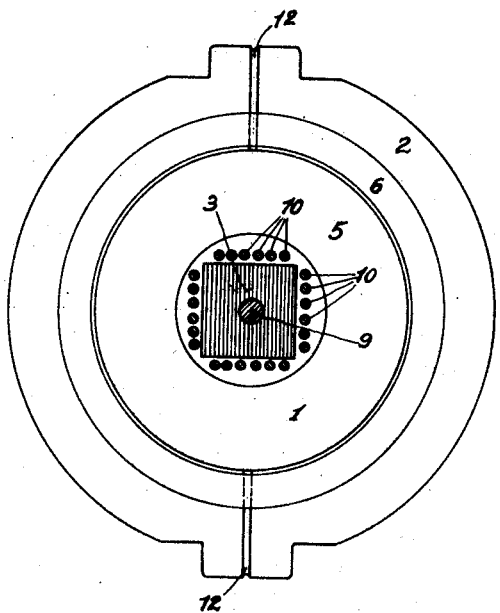
Fig. 2 is a cross section of the invention showing amplified details.
Figure 3:
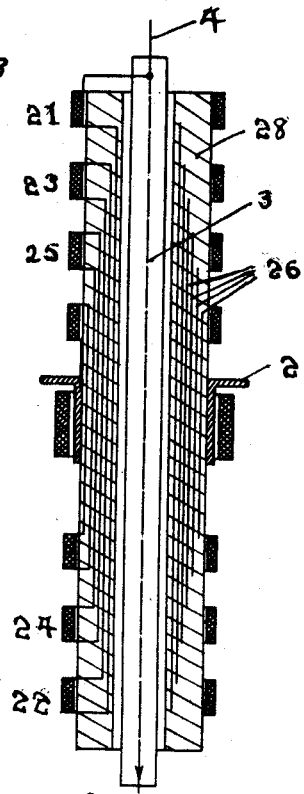
Fig. 3 represents longitudinal section of a variation of the invention.

The present invention relates to a leading-in insulator (bushing) for walls, oil switches, transformers and the like, which is intended to serve as a device for feeding low voltage appliances from high voltage mains, primarily for measuring purposes, for feeding relays and synchronizing appliances. Fig. 1 shows such a device. A transformer is formed by placing an iron core, generally a ferro-magnetic core 3, in the hollow interior of an insulating bushing 1. The core 3 is subjected to the potential of the high voltage line 4, and it can itself also serve as a current conductor, in conjunction with copper conductors. The primary winding 5 is wound upon the insulator bushing 1, and is connected at one end with the high tension conductor and hence with the iron core 3, and at the other end with the grounded frame 2 of the bushing, this being arranged preferably in such a way that uniform voltage drop is thereby produced along the entire winding. The secondary winding 6 is applied over the frame 2 and the terminals thereof are indicated at 6a. The iron core 3 is composed of sheets or wires insulated from one another, in order to reduce eddy current losses. As shown in Fig. 2, on the same ground the conductor carrying the main current is constructed as a wire 9 arranged in the center of the iron core 3, or else a plurality of conductors 10 insulated from one another are applied round the core. Again for the purpose of preventing eddy current, the frame 2 is divided at one place at least by an insulated layer 12. The iron core projects at both ends beyond the winding since the magnetic resistance is thereby considerably smaller than when the core is of the same length as the winding. The windings may be applied only on one side of the frame or else on both sides which involves no alteration in principle. As is usual in the case of high tension transformers, the windings are subdivided into a number of separate coils. In order not to necessitate two complete windings arranged in parallel it is advantageous to connect the first coil 21 in Fig. 3 on one side in series with the first coil 22 on the other side, the latter in its turn with the second coil 23 on the first side, the latter with the second coil 24 on the second side, and so forth through the several coils and to employ for these connections the conducting insertions 26 of a condenser type leading-in insulator 28. This is a bushing the regularity of whose electric field is ensured by means of cylindrical metal foils inserted co-axially. The potential of these metal insertions decreases step-wise from the central iron core 9 or from the high tension conductor 9 which is connected with the iron core 9, right to the frame 2, in the same manner as that of the individual coils, which are connected with one another by means of the condenser insertions 26. According to the principle of the bar current transformer, the device may be built at the same time as a current transformer as shown in Fig. 1, by placing round the frame an annular iron core 7 wound with wire 8, as shown in Fig. 1. The laminated iron core is cut up, at least on one side, in such a way that eddy currents are obviated.

For protection against the weather and against corona, the windings may be covered with an insulating tube, and the remaining air space filled with oil or another insulating material. This is shown in Fig. 4, in which 1 denotes the bushing, 2 the frame with which the same is secured, for instance in a wall, an iron construction, an oil switch or another oil filled boiler, 3 the iron core, 4 the high voltage conductor, 5 the primary winding, 6 the secondary winding, 9 an enclosing insulating tube.

In order to prevent the formation of eddy currents, all the conducting parts are preferably interrupted, in a manner known in itself, by inserting insulating surfaces.

A device having the same effect is produced if the iron core is closed in itself, but also connected with the high tension line. Fig. 5 illustrates such an appliance, in which 1 denotes the bushing, 2 the frame with which the same is secured, 3 the iron core, 4 the voltage conductor, which is connected with the iron core on one point, 5 the primary winding for the voltage transformation, 6 the secondary winding for the voltage transformation, 7 the iron core and 8 the secondary windings of the current transformer.

Another modification is shown in Fig. 6, the reference numerals of like parts corresponding with those in Fig. 5. The voltage transformer windings 5 are distributed to two bushings 1—1. In order that two windings connected in parallel may not be necessary, the first coil of the left bushing lead-in Fig. 6 is connected in series with the first coil of the right bushing lead-in, the latter in its turn with the second on the left, this with the second on the right and so forth. Contrary to the illustration in Fig. 6, the secondary winding 6 can of course be distributed over the two bushings.

Cable sleeves are to be regarded as a kind of leading-in insulators. In principle they are only distinguished from leading-in insulators by the fact that the metallic frame of the insulating tube passes over into the lead sheathing, while in the case of leading-in insulators the insulating tube projects on both sides of the frame. The induction device described may therefore also be fitted to cable sleeves.

What I claim is:—

1. In combination, a bushing or wall duct with induction device for feeding low-voltage appliances from high voltage mains, including an insulator bushing, a grounded frame for the insulator, a ferro-magnetic core located in the interior of the insulator and subjected to the potential of the high-voltage line, a primary winding on the insulator connected at one end with the high tension main and at the other end with the grounded frame of the insulator, a secondary winding located on the frame, the bushing insulating both the windings from the ferro-magnetic core.

2. A device as claimed in claim 1, characterized in that the ferro-magnetic core forms an open magnetic circuit.

3. A device as claimed in claim 1, characterized in that the ferro-magnetic core projects beyond the ends of the coils.

4. A device as claimed in claim 1, characterized in that the device is constructed as a condenser-type leading-in insulator provided with condenser insertions and in which the primary winding is divided, the condenser insertions connecting the divided parts of the winding.

5. A device as claimed in claim 1, characterized in that the ferro-magnetic core is closed.

6. A device as claimed in claim 1, characterized in that the windings are enclosed by insulating means.

7. A device as claimed in claim 1, characterized in that the device serves at the same time to insulate the primary and secondary parts of a current transformer from one another.

In testimony whereof I have affixed my signature.

ALFRED IMHOF.